United States Patent
Chen

(10) Patent No.: US 9,134,847 B2
(45) Date of Patent: Sep. 15, 2015

(54) TOUCH SENSING SYSTEM AND OPERATION METHOD THEREOF

(71) Applicant: AU OPTRONICS CORP., Hsin-Chu (TW)

(72) Inventor: Po-Ching Chen, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 153 days.

(21) Appl. No.: 14/079,710

(22) Filed: Nov. 14, 2013

(65) Prior Publication Data

US 2014/0145983 A1    May 29, 2014

(30) Foreign Application Priority Data

Nov. 28, 2012   (TW) .............................. 101144595 A

(51) Int. Cl.
*G06F 3/041* (2006.01)
*G06F 3/044* (2006.01)

(52) U.S. Cl.
CPC .............. *G06F 3/0416* (2013.01); *G06F 3/044* (2013.01)

(58) Field of Classification Search
CPC ................................. G06F 3/044; G06F 3/0416
USPC ....................................................... 345/173
See application file for complete search history.

(56) References Cited

U.S. PATENT DOCUMENTS

| | | | |
|---|---|---|---|
| 6,628,269 B2 | 9/2003 | Shimizu | |
| 2009/0095540 A1 | 4/2009 | Zachut et al. | |
| 2011/0007003 A1* | 1/2011 | Jang et al. | 345/173 |
| 2011/0012855 A1 | 1/2011 | Yeh et al. | |
| 2011/0279169 A1 | 11/2011 | Salaverry et al. | |
| 2012/0262419 A1* | 10/2012 | Hershman et al. | 345/174 |
| 2015/0131912 A1* | 5/2015 | Kasthuri | 382/202 |

FOREIGN PATENT DOCUMENTS

| | | |
|---|---|---|
| CN | 101520896 A | 9/2009 |
| TW | 201211869 A | 3/2012 |
| TW | 201214256 A | 4/2012 |
| WO | 2012/034715 | 3/2012 |

OTHER PUBLICATIONS

Taiwan Patent Office, "Office Action", Sep. 24, 2014.

* cited by examiner

*Primary Examiner* — Jonathan Blancha
(74) *Attorney, Agent, or Firm* — WPAT, P.C.; Justin King

(57) ABSTRACT

A touch sensing system includes a touch panel, a driving apparatus and a processing circuit. The touch panel includes a plurality of touch sensing units arranged in form of a matrix. The driving apparatus is configured to drive the touch sensing units, receive a sensing signal from each of the touch sensing units, convert each of the received sensing signals to have a digital format and output the digital sensing signals. The processing circuit is configured to define a matrix of sensing value according to values of the received sensing signals and positions of the respective touch sensing units, scan the non-zero elements in the matrix by a predetermined mean, refer all the located non-zero elements to as a part of the contour of the object and calculating a size of a contour of an object. An operation for the touch sensing system is also provided.

12 Claims, 6 Drawing Sheets

| 0 | 0 | 0 | 0 | 0 | 0 | 0 |
|---|---|---|---|---|---|---|
| 0 | 6 | 6 | 8 | 4 | 2 | 0 |
| 0 | 12 | 61 | 86 | 27 | 4 | 0 |
| 0 | 18 | 88 | 105 | 37 | 5 | 0 |
| 0 | 17 | 52 | 50 | 13 | 4 | 0 |
| 0 | 6 | 14 | 14 | 3 | 0 | 0 |
| 0 | 0 | 0 | 0 | 0 | 0 | 0 |

| 0 | 0 | 0 | 0 | 0 | 0 | 0 |
|---|---|---|---|---|---|---|
| 0 | 6 | 6 | 8 | 4 | 2 | 0 |
| 0 | 12 | 61 | 86 | 27 | 4 | 0 |
| 0 | 18 | 88 | 105 | 37 | 5 | 0 |
| 0 | 17 | 52 | 50 | 13 | 4 | 0 |
| 0 | 6 | 14 | 14 | 3 | 0 | 0 |
| 0 | 0 | 0 | 0 | 0 | 0 | 0 |

| 0 | 0 | 0 | 0 | 0 | 0 | 0 |
|---|---|---|---|---|---|---|
| 0̶ | 6̶ | 6̶ | 8̶ | 4̶ | 2 | 0 |
| 0 | 12 | 61 | 86 | 27 | 4 | 0 |
| 0 | 18 | 88 | 105 | 3̶7̶ | 5 | 0 |
| 0 | 17 | 52 | 50 | 1̶3̶ | 4 | 0 |
| 0 | 6 | 14 | 14 | 3̶ | 0 | 0 |
| 0 | 0 | 0 | 0 | 0 | 0 | 0 |

| 0 | 0 | 0 | 0 | 0 | 0 | 0 |
|---|---|---|---|---|---|---|
| 0 | 6̶ | 6̶ | 8̶ | 4̶ | 2 | 0 |
| 0 | 12 | 61 | 86 | 27 | 4 | 0 |
| 0 | 18 | 88 | 105 | 37 | 5 | 0 |
| 0 | 17 | 52 | 50 | 13 | 4 | 0 |
| 0 | 6̶ | 1̶4̶ | 1̶4̶ | 3̶ | 0 | 0 |
| 0 | 0 | 0 | 0 | 0 | 0 | 0 |

| 0 | 0 | 0 | 0 | 0 | 0 | 0 |
|---|---|---|---|---|---|---|
| 0 | 1 | 1 | 1 | 1 | 1 | 0 |
| 0 | 1 | 1 | 1 | 1 | 1 | 0 |
| 0 | 1 | 1 | 1 | 1 | 1 | 0 |
| 0 | 1 | 1 | 1 | 1 | 1 | 0 |
| 0 | 1 | 1 | 1 | 1 | 0 | 0 |
| 0 | 0 | 0 | 0 | 0 | 0 | 0 |

200

FIG. 6 refer the last located non-zero element in the searching direction to as an axis, scan, initially starting from the searching direction, the elements adjacent to the last located non-zero element within a predetermined angle range relative to the searching direction based on the axis, and modulate the searching direction to have a direction from the first located non-zero element within the predetermined angle range to the last located non-zero element in the searching direction before being modulated ~S708 refer, when the starting point is scanned again, all the previously located non-zero elements to as a part of the contour of the object and thereby further calculate a size the contour of the object ~S710

FIG. 7B

TOUCH SENSING SYSTEM AND OPERATION METHOD THEREOF

TECHNICAL FIELD

The present disclosure relates to a field of touch control technology, and more particularly to a touch sensing system and an operation method thereof.

BACKGROUND

With the development of touch technology, touch input devices have been widely used in many end electronic products. Because being capable of providing a better controlling and various interface operation ways, touch input devices have replaced the traditional input devices, such as mouse and keyboard, and accordingly the end electronic products need less space and consequentially solve the issue of being inconvenient to carry the peripheral input device.

Based on the touch technology, touch panels can be categorized to resistive, capacitive, optical and sound wave types; wherein the capacitive touch panel currently is relatively more popular in the market and has a higher market share. However, there still has some problems needed to be solved in the conventional capacitive touch sensing system. For example, a capacitive touch sensing system may result in an error operation while a touch panel thereof is being touched by a palm or a wrist of a user; or, for eliminating the effect of wrong touching, the sensing system may be designed to have a complex operation, which may consequentially lead to a long operation time.

SUMMARY

The present disclosure provides a touch sensing system, which includes a touch panel, a driving apparatus and a processing circuit. The touch panel includes a plurality of touch sensing units arranged in form of a matrix. The driving apparatus, electrically connected to the touch sensing units, is configured to drive the touch sensing units, receive a sensing signal from each of the touch sensing units, convert each of the received sensing signals to have a digital format and output the digital sensing signals. The processing circuit is configured to receive the sensing signals outputted from the driving apparatus, define a matrix of sensing value according to values of the received sensing signals and positions of the respective touch sensing units, scan the matrix of sensing value row by row as well as sequentially scan, in a predetermined direction, values of all elements in a respective being-scanned row, and refer the first located non-zero element as a starting point of a contour of an object. The processing circuit is further configured to search the other one or more non-zero elements in a searching direction, which is initially parallel to the predetermined direction, starting from the starting point, refer the last located non-zero element in the searching direction to as an axis, scan, initially starting from the searching direction, the elements adjacent to the last located non-zero element within a predetermined angle range relative to the searching direction based on the axis, and modulate the searching direction to have a direction from the first located non-zero element within the predetermined angle range to the last located non-zero element in the searching direction before being modulated. The processing circuit is further configured to, when the starting point is scanned again, refer all the previously located non-zero elements to as a part of the contour of the object and calculating a size of the contour of the object.

The present disclosure further disclosure provides an operation method for a touch sensing system. The touch sensing system includes a touch panel and a driving apparatus. The touch panel includes a plurality of touch sensing units arranged in form of a matrix. The driving apparatus, electrically connected to the touch sensing units, is configured to drive the touch sensing units, receive a sensing signal from each of the touch sensing units, convert each of the received sensing signals to have a digital format and output the digital sensing signals. The operation method includes steps of: defining a matrix of sensing value according to values of the sensing signals outputted from the driving apparatus and positions of the respective touch sensing units; scanning the matrix of sensing value row by row as well as sequentially scanning, in a predetermined direction, values of all elements in a respective being-scanned row, and referring the first located non-zero element as a starting point of a contour of an object; searching the other one or more non-zero elements in a searching direction, which is initially parallel to the predetermined direction, starting from the starting point; referring the last located non-zero element in the searching direction to as an axis, scanning, initially starting from the searching direction, the elements adjacent to the last located non-zero element within a predetermined angle range relative to the searching direction based on the axis, and modulating the searching direction to have a direction from the first located non-zero element within the predetermined angle range to the last located non-zero element in the searching direction before being modulated; and referring, when the starting point is scanned again, all the previously located non-zero elements to as a part of the contour of the object and further calculating a size the contour of the object.

BRIEF DESCRIPTION OF THE DRAWINGS

The present disclosure will become more readily apparent to those ordinarily skilled in the art after reviewing the following detailed description and accompanying drawings, in which:

FIG. 2 is an exemplary matrix of sensing value defined by a processing circuit;

FIGS. 3, 4 and 5 are schematic views for illustrating an exemplary predetermined mean for searching and locating the non-zero elements in a matrix of sensing value in one embodiment;

FIG. 6 is a schematic view of the matrix of sensing value shown in FIG. 2 after being processed by the binarization operation; and FIGS. 7A and 7B are a flowcharts illustrating an operation method for a touch sensing system in accordance with an embodiment of the present disclosure.

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
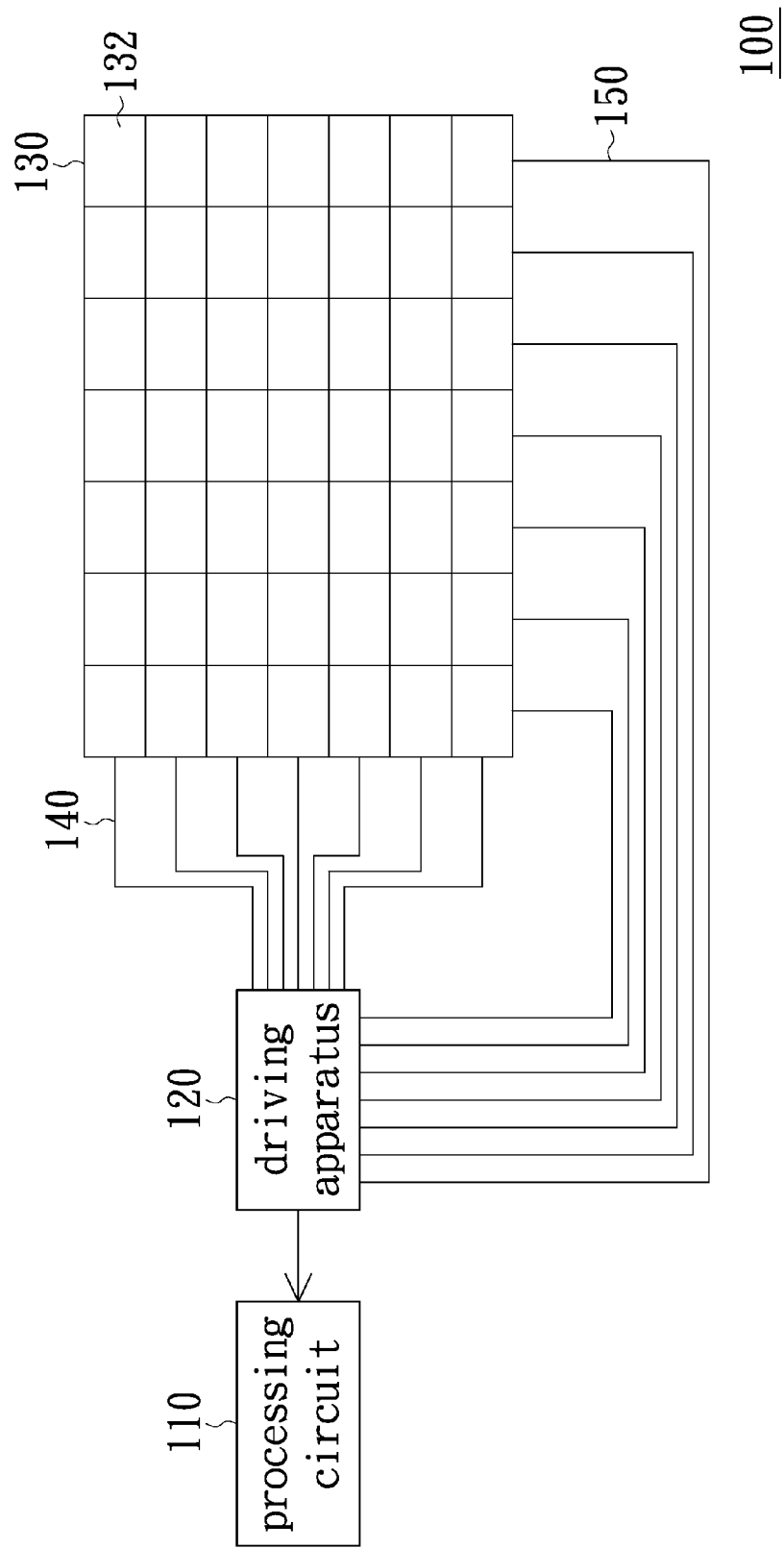
FIG. 1 is a schematic view of a touch sensing system in accordance with an embodiment of the present disclosure.

FIG. 1 is a schematic view of a touch sensing system in accordance with an embodiment of the present disclosure. As shown, the touch sensing system 100 in this embodiment includes a processing circuit 110, a driving apparatus 120 and a touch panel 130. The touch panel 130 includes a plurality of touch sensing units 132 arranged in form of a matrix. Herein, the touch panel 130 preferably is a capacitive touch panel; and the present disclosure is not limited thereto. In addition, the number of the touch sensing unit 132 in the touch panel 130 shown in FIG. 1 is for an exemplary purpose only; and the present disclosure is not limited thereto. The driving apparatus 120 is electrically connected to the touch sensing units 132 through a plurality of first conductive lines 140 and a plurality of second conductive lines 150. Each of the first conductive line 140 is electrically connected to one respective row of touch sensing unit 132; and each of the second conductive line 150 is electrically connected to one respective column of touch sensing unit 132.

The driving apparatus 120 is configured to drive the touch sensing units 132 and from each which to receive a sensing signal. Specifically, the driving apparatus 120 may sequentially provide a driving signal to all the rows of touch sensing unit 132 row by row through the first conductive lines 140, receive the sensing signals generated by the same row of being-driven touch sensing units 13 through the second conductive lines 150, convert each the received sensing signal to have a digital format, and output the digital sensing signals.

The processing circuit 110 is configured to receive the sensing signals outputted from the driving apparatus 120 and define a matrix of sensing value according to the values of the received sensing signals and the positions of the respective touch sensing units 132. FIG. 2 is an exemplary matrix of sensing value 200 defined by the processing circuit 110; wherein the matrix of sensing value 200 herein is exemplified by a 7×7 matrix. Specifically, the values of all elements in the matrix of sensing value 200 are corresponding to the values of sensing signals generated by the touch sensing units 132, respectively. In other words, the value of element (i. j) in the matrix of sensing value 200 indicates the value of the sensing signal generated by the touch sensing unit 132 located in the $i_{th}$ row and the $j_{th}$ column of the touch panel 130; wherein i and j are natural numbers.

After a matrix of sensing value is defined, the processing circuit 110 is further configured to search and locate the non-zero elements in the matrix of sensing value by a predetermined mean, refer all the located non-zero elements as a contour of an object and thereby calculate a size of the contour of the object. The aforementioned predetermined mean for searching and locating the non-zero elements in the matrix of sensing value will be described as follow in detail by using the matrix of sensing value 200.

FIG. 3 is a schematic view for illustrating an exemplary predetermined mean for searching and locating the non-zero elements in a matrix of sensing value in one embodiment. As shown, after the matrix of sensing value 200 is defined, the processing circuit 110 first scans the matrix of sensing value 200 row by row as well as sequentially scan, in a determined direction, values of all elements in a respective being-scanned row, and refers the first located non-zero element in the matrix of sensing value 200 as a starting point of a contour of an object. For example, as illustrated in FIG. 3, the processing circuit 110 scans the matrix of sensing value 200 by way of from the first row to the last row therein and sequentially scans the values of all elements in a respective being-scanned row in a direction from the first element to the last element therein. In other words, the predetermined direction herein is defined as a direction from the first element to the last element in the same row. In another embodiment, it is understood that the processing circuit 110 may scans the matrix of sensing value 200 by way of from the last row to the first row therein. In still another embodiment, it is understood that the predetermined direction may be defined as a direction from the last element to the first element in a respective being-scanned. In this embodiment as illustrated in FIG. 3, accordingly the processing circuit 110 refers the element located in the second row and the second column (i.e., the element (2, 2)) as a starting point of a contour of an object.

In the predetermined mean for searching and locating the non-zero elements in a matrix of sensing value as illustrated in FIG. 3, the processing circuit 110, after the starting point is located, sequentially searches the other one or more non-zero elements in a searching direction, which is initially parallel to the aforementioned predetermined direction, starting from the starting point. For example, in this embodiment as illustrated in FIG. 3, the current searching direction is same as the predetermined direction and accordingly the processing circuit 110 sequentially searches the other non-zero elements in the second row in a direction from the first element to the last element therein. In another embodiment, it is understood that the searching direction may be a direction from the last element to the first element a respective being-scanned.

In the predetermined mean for searching and locating the non-zero elements in a matrix of sensing value, the processing circuit 110 is further configured to, after the last non-zero element in the current searching direction is located, refer the last located non-zero element to as an axis, scan all the elements adjacent to the last located non-zero element within a predetermined angle range relative to the current searching direction based on the axis, and modulate the searching direction to have a direction from the first located non-zero element within the predetermined angle range to the last located non-zero element in the searching direction before being modulated. And the angle range of the scanning the predetermined angle range relative to the searching direction based on the axis is from small to big. For example, as illustrated in FIG. 3, the element (2, 6) is located, by the processing circuit 110, as the last non-zero element in the current searching direction (i.e., (2, 1) to (2, 6)).

Therefore, the processing circuit 110 refers the element (2, 6) as an axis and scans, initially starting from the searching direction (i.e., (2, 1) to (2, 6)), the elements adjacent to the last located non-zero element (i.e., the element (2, 6)) within a predetermined angle range relative to the searching direction (i.e., (2, 1) to (2, 6)) based on the axis (i.e., the element (2, 6)); wherein the predetermined angle range has a clockwise-rotation angle range of about 180 degrees in the embodiment. As illustrated in FIG. 3, because the element (3, 6) is the first non-zero element located within the predetermined angle range, accordingly the processing circuit 110 modulates the searching direction from a direction ((2, 1) to (2, 6)) to a direction ((2, 6) to (3, 6)) and searches the other one or more non-zero elements in the current searching direction (i.e., (2, 6) to (3, 6)) to locate the last non-zero element in the current searching direction (i.e., (2, 6) to (3, 6)), which is the element (5, 6)).

As illustrated in FIG. 4, based on the same manner, the processing circuit 110 refers the element (5, 6) as an axis and scans, initially starting from the searching direction (i.e., (2, 6) to (3, 6)), the elements adjacent to the last located non-zero element (i.e., the element (5, 6)) within a predetermined angle range relative to the searching direction (i.e., (2, 6) to (3, 6)) based on the axis (i.e., the element (5, 6)); wherein the predetermined angle range has a clockwise-rotation angle range of about 180 degrees in the embodiment. As illustrated in FIG. 4, because the element (6, 5) is the first non-zero element located within the predetermined angle range, accordingly the processing circuit 110 modulates the searching direction from a direction ((2, 6) to (3, 6)) to a direction ((6, 5) to (5, 6))

and searches the other one or more non-zero elements in the current searching direction (i.e., (6, 5) to (5, 6)) to locate the last non-zero element in the current searching direction (i.e., (6, 5) to (5, 6)), which is the element (6, 5). Still, based on the same manner, the processing circuit 110 refers the element (6, 5) as an axis and scans, initially starting from the searching direction (i.e., (6, 5) to (5, 6)), the elements adjacent to the last located non-zero element (i.e., the element (6, 5)) within a predetermined angle range relative to the searching direction (i.e., (6, 5) to (5, 6)) based on the axis (i.e., the element (6, 5)); wherein the predetermined angle range has a clockwise-rotation angle range of about 180 degrees in the embodiment.

As illustrated in FIG. 5, because the element (6, 4) is the first non-zero element located within the predetermined angle range, accordingly the processing circuit 110 modulates the searching direction from a direction ((6, 5) to (5, 6)) to a direction ((6, 4) to (6, 5)) and searches the other one or more non-zero elements in the current searching direction (i.e., (6, 4) to (6, 5)) to locate the last non-zero element in the current searching direction (i.e., (6, 4) to (6, 5)), which is the element (6, 2). Still, based on the same manner, the processing circuit 110 refers the element (6, 2) as an axis and scans, initially starting from the searching direction (i.e., (6, 4) to (6, 5)), the elements adjacent to the last located non-zero element (i.e., the element (6, 2)) within a predetermined angle range relative to the searching direction (i.e., (6, 4) to (6, 5)) based on the axis (i.e., the element (6, 2)); wherein the predetermined angle range has a clockwise-rotation angle range of about 180 degrees in the embodiment.

As illustrated in FIG. 5, because the element (5, 2) is the first non-zero element located within the predetermined angle range, accordingly the processing circuit 110 modulates the searching direction from a direction ((6, 4) to (6, 5)) to a direction ((5, 2) to (6, 2)) and searches the other one or more non-zero elements in the current searching direction (i.e., (5, 2) to (6, 2)) to locate the last non-zero element in the current searching direction (i.e., (5, 2) to (6, 2)), which is the element (2, 2).

In the predetermined mean for searching and locating non-zero elements in a matrix of sensing value, the processing circuit 110 is further configured to refer, when the starting point is scanned again, all the previously located non-zero elements to as a part of the contour of the object and thereby further calculate the size of the contour of the object. For example, in the embodiment as illustrated in FIG. 5, when the element (2, 2) previously referred to as a starting point is scanned again, the processing circuit 110 refers all the previously located non-zero elements (indicated by arrows) to as a part of the contour of the object; consequentially, the processing circuit 110 calculates the size the contour of the object based on the all the previously located non-zero elements.

In an embodiment, it is to be noted that a specified element may be referred to as a last located non-zero element and a starting point in the same searching direction.

As exemplarily described above, the predetermined angle range has a clockwise-rotation angle range of 180 degrees; however, the present disclosure is not limited thereto. In other words, the predetermined angle range may have a counterclockwise-rotation angle range of about 180 degrees in another embodiment. If the predetermined angle range has a counterclockwise-rotation angle range of 180 degrees, accordingly, the processing circuit 110 may search and locate the non-zero elements in the matrix of sensing value 200 via a path completely opposite to the path indicated by the arrows as illustrated in FIG. 5. It is understood that the predetermined angle range may have other definitions other than the aforementioned two, such as a clockwise-rotation angle range of about 135 degrees or a counterclockwise-rotation angle range of about 75 degrees.

Additionally, in the predetermined mean for searching and locating non-zero elements in a matrix of sensing value, the processing circuit 110 may be further configured to perform a binarization operation on the values of all the elements in the matrix of sensing value 200 before the step of scanning the matrix of sensing value 200. FIG. 6 is a schematic view of the matrix of sensing value 200 after being processed by the binarization operation. As shown, all the elements in the matrix of sensing value 200 after being processed by the binarization operation have a value either 1 or 0; specifically, the values of all the non-zero elements in the matrix of sensing value 200 after being processed by the binarization operation are converted into 1, and the values of all the zero elements are maintained to 0. Consequentially, the processing circuit 110 then calculates the size of the object contour in accordance with the aforementioned predetermined mean after the values of all the elements in the matrix of sensing value 200 are performed by the binarization operation.

Figure 7A:
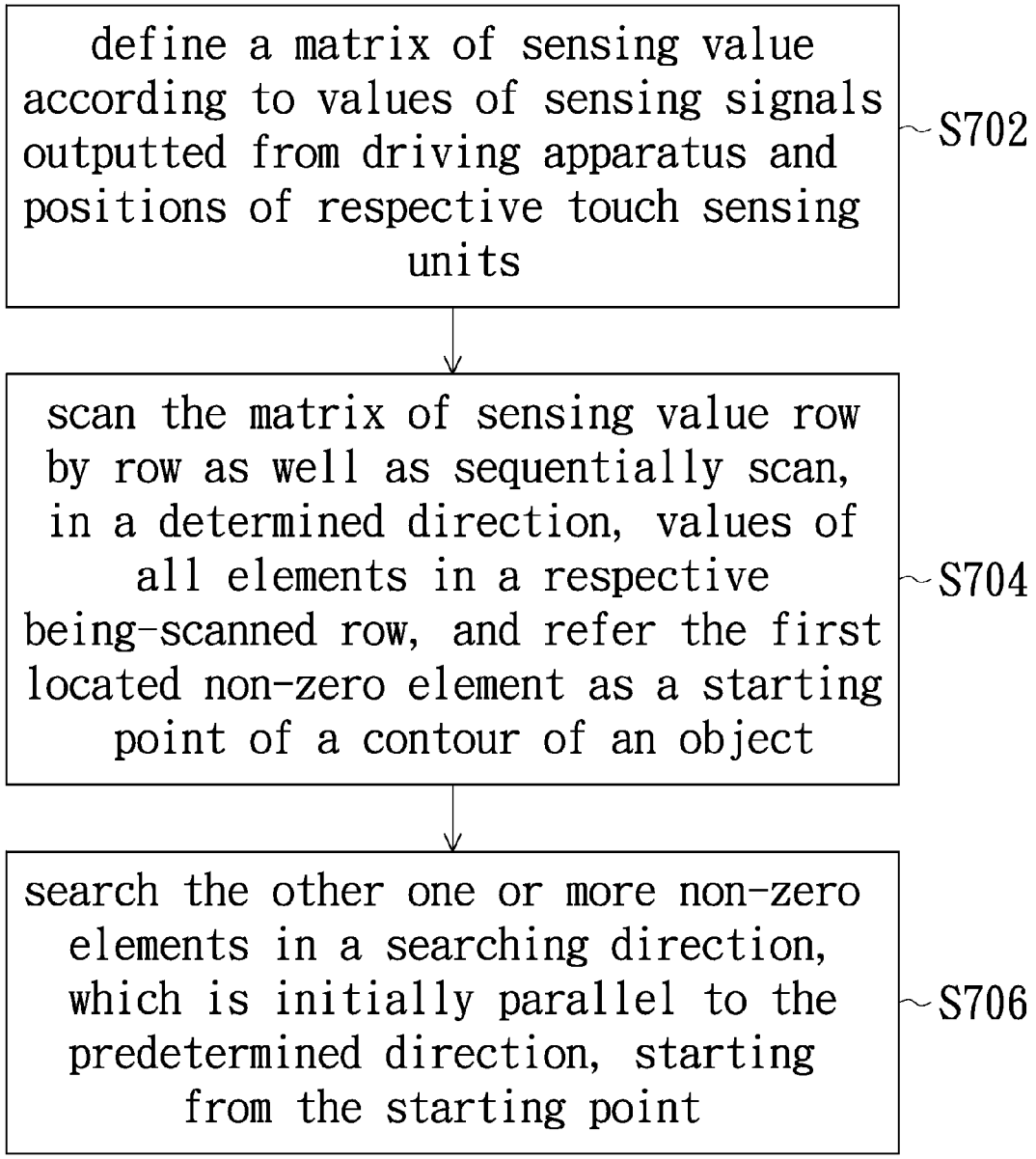

According to the descriptions in the aforementioned embodiments, an operation method for a touch sensing system can be summarized by those ordinarily skilled in the art as illustrated in FIG. 7, which is a flowchart illustrating an operation method for a touch sensing system in accordance with an embodiment of the present disclosure. The touch sensing system includes a touch panel and a driving apparatus. The touch panel includes a plurality of touch sensing units arranged in form of a matrix. The driving apparatus, electrically connected to the touch sensing units, is configured to drive the touch sensing units, receive a sensing signal from each of the touch sensing units, convert each of the received sensing signals to have a digital format and output the digital sensing signals. As illustrated in FIGS. 7A and 7B, the operation method includes steps of: defining a matrix of sensing value according to values of the sensing signals outputted from the driving apparatus and positions of the respective touch sensing units (step S702); scanning the matrix of sensing value row by row as well as sequentially scanning, in a determined direction, values of all elements in a respective being-scanned row, and referring the first located non-zero element as a starting point of a contour of an object (step S704); searching the other one or more non-zero elements in a searching direction, which is initially parallel to the predetermined direction, starting from the starting point (step S706); referring the last located non-zero element in the searching direction to as an axis, scanning, initially starting from the searching direction, the elements adjacent to the last located non-zero element within a predetermined angle range relative to the searching direction based on the axis, and modulating the searching direction to have a direction from the first located non-zero element within the predetermined angle range to the last located non-zero element in the searching direction before being modulated (step S708); and referring, when the starting point is scanned again, all the previously located non-zero elements to as a part of the contour of the object and thereby further calculating a size the contour of the object (step S710).

In summary, by sequentially defining a matrix of sensing value according to values of the sensing signals outputted from a driving apparatus in a touch sensing system and positions of respective touch sensing units in a touch panel of the touch sensing system; scanning the matrix of sensing value row by row as well as sequentially scanning, in a determined direction, values of all elements in a respective being-scanned row, and referring the first located non-zero element as a starting point of a contour of an object; searching the other one or more non-zero elements in a searching direction, which is initially parallel to the predetermined direction, starting from the starting point; referring the last located non-zero element in the searching direction to as an axis, scanning, initially starting from the searching direction, the elements adjacent to the last located non-zero element within a predetermined angle range relative to the searching direction based on the axis, and modulating the searching direction to have a direction from the first located non-zero element within the predetermined angle range to the last located non-zero element in the searching direction before being modulated; and referring, when the starting point is scanned again, all the previously located non-zero elements to as a part of the contour of the object, the present disclosure may calculate a size of the object via the contour thereof instead of via calculating the area of the touched points. Thus, the operation of the touch sensing system of the present disclosure is relatively simple and has a shorter operation time. In addition, the zigzag shape resulted from the edge noise may be eliminated by the operation method of the present disclosure, and accordingly the touched area generated by the detection of the operation method of the present disclosure has a smooth convergence zone.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A touch sensing system, comprising:
   a touch panel comprising a plurality of touch sensing units arranged in form of a matrix;
   a driving apparatus, electrically connected to the touch sensing units, configured to drive the touch sensing units, receive a sensing signal from each of the touch sensing units, convert each of the received sensing signals to have a digital format and output the digital sensing signals; and
   a processing circuit configured to receive the sensing signals outputted from the driving apparatus, define a matrix of sensing value according to values of the received sensing signals and positions of the respective touch sensing units, scan the matrix of sensing value row by row as well as sequentially scan, in a predetermined direction, values of all elements in a respective being-scanned row, and refer the first located non-zero element as a starting point of a contour of an object; the processing circuit being further configured to search the other one or more non-zero elements in a searching direction, which is initially parallel to the predetermined direction, starting from the starting point, refer the last located non-zero element in the searching direction to as an axis, scan, initially starting from the searching direction, the elements adjacent to the last located non-zero element within a predetermined angle range relative to the searching direction based on the axis, and modulate the searching direction to have a direction from the first located non-zero element within the predetermined angle range to the last located non-zero element in the searching direction before being modulated; the processing circuit being further configured to, when the starting point is scanned again, refer all the previously located non-zero elements to as a part of the contour of the object and calculating a size of the contour of the object.

2. The touch sensing system according to claim 1, wherein the predetermined direction is defined as a direction from the first element to the last element in a respective row, or, a direction from the last element to the first element in the respective row.

3. The touch sensing system according to claim 1, wherein the searching direction, parallel to the predetermined direction, is defined as a direction from the first element to the last element in a respective row, or, a direction from the last element to the first element in the respective row.

4. The touch sensing system according to claim 1, wherein the predetermined angle range has a clockwise-rotation angle range of about 180 degrees, or, a counterclockwise-rotation angle range of about 180 degrees.

5. The touch sensing system according to claim 1, wherein the processing circuit is further configured to, before scanning the matrix of sensing value row by row, perform a binarization operation on the values of all the elements in the matrix of sensing value.

6. The touch sensing system according to claim 1, wherein the angle range of the scanning the predetermined angle range relative to the searching direction based on the axis is from small to big.

7. An operation method for a touch sensing system, the touch sensing system comprising a touch panel and a driving apparatus, the touch panel comprising a plurality of touch sensing units arranged in form of a matrix, the driving apparatus, electrically connected to the touch sensing units, being configured to drive the touch sensing units, receive a sensing signal from each of the touch sensing units, convert each of the received sensing signals to have a digital format and output the digital sensing signals, the operation method comprising:
   defining a matrix of sensing value according to values of the sensing signals outputted from the driving apparatus and positions of the respective touch sensing units;
   scanning the matrix of sensing value row by row as well as sequentially scanning, in a predetermined direction, values of all elements in a respective being-scanned row, and referring the first located non-zero element as a starting point of a contour of an object;
   searching the other one or more non-zero elements in a searching direction, which is initially parallel to the predetermined direction, starting from the starting point;
   referring the last located non-zero element in the searching direction to as an axis, scanning, initially starting from the searching direction, the elements adjacent to the last located non-zero element within a predetermined angle range relative to the searching direction based on the axis, and modulating the searching direction to have a direction from the first located non-zero element within the predetermined angle range to the last located non-zero element in the searching direction before being modulated; and
   referring, when the starting point is scanned again, all the previously located non-zero elements to as a part of the contour of the object and further calculating a size of the contour of the object.

8. The operation method according to claim 7, wherein the predetermined direction is defined as a direction from the first element to the last element in a respective row, or, a direction from the last element to the first element in the respective row.

9. The operation method according to claim 7, wherein the searching direction, parallel to the predetermined direction, is defined as a direction from the first element to the last element in a respective row, or, a direction from the last element to the first element in the respective row.

10. The operation method according to claim 7, wherein the predetermined angle range has a clockwise-rotation angle range of about 180 degrees, or, a counterclockwise-rotation angle range of about 180 degrees.

11. The operation method according to claim 7, further comprising:
   performing, before scanning the matrix of sensing value row by row, a binarization operation on the values of all the elements in the matrix of sensing value.

12. The operation method according to claim 7, wherein the angle range of the scanning the predetermined angle range relative to the searching direction based on the axis is from small to big.

* * * * *